2,976,266
FILM-FORMING POLYESTERS OF BIBENZOIC ACID

Marion R. Lytton, West Chester, and Edward A. Wielicki, Philadelphia, Pa., assignors to American Viscose Corporation, Philadelphia, Pa., a corporation of Delaware No Drawing. Filed Oct. 17, 1957, Ser. No. 690,639

8 Claims. (Cl. 260—75)

This invention relates to new linear polyesters, molded articles prepared therefrom and methods of preparing the same. More specifically it is directed to the preparation of films and fibers from linear polyesters formed by the condensation of mixed glycols with bibenzoic acid, this acid having the formula

The history of polyester films is a relatively short but active one. Condensation polyesters, while encountered in early researches such as those of Lourenco, Bischoff, Fischer, etc., were not intensively studied until 1928, when Carothers and coworkers began a systematic study of condensation polymerization. Illustrative of Carothers' work is U.S. Patent No. 2,071,250 (1937) which discusses some of the previous work in the field and some of the problems in drawing polyesters into fibers. Carothers produced filaments from his polyesters, but they were low-melting and lacked hydrolytic stability.

The current prior art describes various linear condensation polyesters derived from dihydroxy compounds and dibasic acids such as terephthalic acid which are capable of being drawn into fibers showing by characteristic X-ray patterns, orientation along the fiber axis. However, in using a single glycol and single acid to prepare a polyester, one is limited to a fixed crystal structure and melting point since the ratio of glycol to acid in the ester base cannot be varied.

This invention overcomes these limitations in providing new and useful linear, highly polymeric esters having valuable properties, including that of being capable of being formed into useful filaments, films, and the like, and having high melting points and a low degree of solubility in organic solvents. A further object is the provision of new and useful, synthetic filaments and films. A still further object is the provision of a new process for making the polyesters of this invention. Other objects will appear hereinafter.

The synthetic products according to the present invention are high-melting, difficultly soluble, usually crystallizable, cold-drawing, linear highly polymerized esters of bibenzoic acid and mixed glycols of 2–10 carbon atoms, more specifically a mixture of straight chain and branched glycols.

In the process of this invention it is advantageous to begin with a diester derived from bibenzoic acid and a low molecular weight monohydric alcohol and to effect ester interchange with the glycols or polyhydric alcohols to form a mixture of diglycol esters. When using the ester interchange method, the time required to form the polyesters is generally considerably less than when the free dicarboxylic acid is employed. The long chain polyester is built up by a series of ester interchange reactions wherein glycols are evolved. During the last stages of the reaction, it is generally desirable to heat the condensing reaction mixture in order to maintain the molten state.

The process comprises, first, reacting a p,p'-bibenzoic diester having the formula:

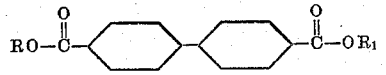

where R and $R_1$ are alkyl radicals of 1–6 carbon atoms, with a mixture of aliphatic glycols in the ratio of one mole of the diester to at least two moles of the mixed glycols. Theoretically a total of only one mole of the mixed glycols is necessary to effect complete polyesterification with one mole of the diester of bibenzoic acid. However, in practice, this leads to an inferior product. It is preferable therefore to utilize an excess of about 105% to 125% of the mixed glycols. In other words, for every mole of the diester of bibenzoic acid, one should utilize about 2.05 to about 2.25 moles of the mixed glycols.

The glycols are alkylene glycols of 2–10 carbon atoms and may be either straight or branched chain, and must be higher boiling than the R and $R_1$ alcohols so as to displace the latter on heating. This step is effected in the presence of an ester interchange catalyst, at elevated temperature in an inert atmosphere. Heating is usually at atmospheric pressure, but higher or low pressures may be used. Preferably the heating is conducted in the presence of an inert gas and is continued until the distillation of the displaced alcohol ceases, at which time the first stage of the ester interchange can be assumed to be complete, i.e., the expulsion of the monohydric alcohol.

The second step is that of effecting condensation of the diglycol esters of bibenzoic acid thereby formed with themselves, with the elimination of glycols and the accompanying formation of polyester. The distillation vessel should first be heated gradually to an elevated temperature and slowly evacuated to a reduced pressure, the temperature being high enough to keep the mass molten during the polymerization period, it being understood that the melting point and viscosity of the melt increases gradually during the polymerization. Under these conditions the glycols distill off, with the formation of polymeric material. When the desired viscosity has been reached the vacuum source is turned off, heating is discontinued, an inert gas admitted, the vessel allowed to cool to approximate room temperature and the polymer removed.

The film properties desired are (1) high melting point, i.e., above 140° C., and preferably 200–270° C., (2) lack of color, (3) toughness, (4) controlled crystallizability dependent upon thermal treatment and (5) pliability. Items 1 and 4 are important in order that the film have good thermal and dimensional stability under a variety of conditions. The advantages of lack of color, toughness, and pliability are readily apparent. In order for these last two characteristics to be attained, the film-forming polymer must not be too highly crystalline. In other words, it must be capable of being easily converted to an amorphous form which can be oriented by cold drawing. Furthermore, it must be able to remain in the non-crystalline state indefinitely at ordinary temperatures. On the other hand, the film-forming polymer must have latent ability to crystallize, for if it does not it is then brittle toward impact and possesses poor dimensional stability.

The glycols which can be employed to form highly polymeric linear polyesters include the lower alkylene diols, viz., polymethylene glycols, wherein the hydroxy radicals are positioned at the two ends of the alkylene chain. Examples of such glycols include ethylene glycol, 1,3-propanediol, 1,4-butanediol, 1,5-pentanediol, 1,6-hexanediol, 1,8-octanediol, 1,10-decanediol, etc. Polyesters of bibenzoic acid with these glycols alone are excessively crystalline. This is undesirable because it prevents subsequent linear orientation of the polymer chains. In order to break up this crystallinity it is necessary to introduce side chains on a portion of the glycol molecules. The branched chain glycols employed in the formation of the mixed ester of this invention are preferably those having the following general formula:

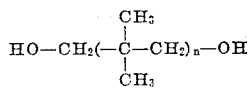

where $n$ is 1, 2, or 3. A preferred member of this group is neopentylene glycol (2,2-dimethyl-propanediol-1,3).

The temperature at which polyesterification can be conducted is dependent upon the specific reactants involved in any given reaction. In general, the ester interchange step requires heating from about 150–200° C. (preferably 175–200° C.) for approximately 2–6 hours in an inert atmosphere (e.g. nitrogen or hydrogen). Finally, for polymerization the temperature should be adjusted gradually to 150–400° C. (preferably 200–350° C.), and then the pressure is gradually reduced (less than about 15 mm. of Hg pressure but preferably less than 5 mm. of Hg pressure). Optimum operating conditions dictate a temperature ranging between 250–350° C. and reduced pressure of 0.1 to 0.2 mm. Hg. These conditions are advantageously maintained for approximately 2–10 additional hours. This final phase is advantageously carried out with agitation under the high vacuum in order to facilitate the escape of volatile products from the highly viscous melt. The conditions can be varied considerably depending upon the degree of polyesterification desired, the ultimate properties sought, the stability of the polyester being produced, and the use for which the product is intended.

The catalytic condensing agents or ester-interchange catalysts which can be employed include the alkali metals, the alkaline earth metals; the oxides, carbonates, and borates of these two groups of metals; the one to six carbon alkoxides of these two groups of metals; magnesium, zinc, and manganese; the oxides of these metals; zinc borate; the halides, sulfates, phosphates and chloracetates of zinc, cadmium, magnesium, aluminum, and copper; litharge or a combination of litharge with antimony trioxide and triphenyl phosphite as described in U.S. Patent No. 2,650,213; compounds of the formula $$M(Al(OR)_4)$$

wherein M is an alkali metal, e.g., lithium, sodium, or potassium, and R is an alkyl radical containing from 1 to 6 carbon atoms; R can be derived from a lower aliphatic alcohol such as methyl, ethyl, propyl, n-butyl, isobutyl, n-amyl, etc. (U.S. 2,720,506); a composition consisting of lithium hydride and a glycol-soluble organic salt of cadmium, magnesium, or zinc as described in U.S. Patent No. 2,681,360.

From about 0.005% to about 0.2% of such catalysts based on the weight of diester monomer being condensed can be employed. Higher or lower percentages can also be employed. Generally, from about 0.01% to about 0.05% of the catalytic condensing agent can be advantageously employed, based on the weight of dibasic acid diester being condensed.

The reaction can be carried out in the presence or absence of a solvent, preferably the latter. Inert, high boiling compounds, such as diphenyl ether, diphenyl, mixed tolyl sulfones, chlorinated naphthalene, chlorinated diphenyl, dimethyl sulfolane, etc., can be used as the reaction medium.

It is essential to exclude oxygen and moisture at all stages of the condensation reaction. Otherwise discoloration, low molecular weight, and/or insolubilization of the polyester results. Inert atmospheres which can advantageously be employed include nitrogen, hydrogen, helium, etc. The exclusion of moisture is readily effected by employing substantially anhydrous reactants.

Examples of the various diesters which can be employed in accordance with the process of this invention include the ethyl, propyl, n-butyl, sec-butyl, isopropyl, sec-amyl, n-hexyl, etc., diester of p,p'-bibenzoic acid. As previously stated, it is always necessary that the alcohol forming the diester have a lower boiling point than that of the glycol reacted therewith, so that the alcohol can be boiled off as it is replaced by the glycol. For this reason the dimethyl ester of the acid is preferred.

EXAMPLE I

The following ingredients were charged, in the ratio indicated below, into a polymerization vessel, arranged for heating by a silicone oil bath.

| | Moles |
|---|---|
| 4,4'dimethyl bibenzoate | 1 |
| Ethylene glycol | 1.76 |
| Neopentylene glycol | 0.44 |

A slow stream of $N_2$, led in by a capillary, was used to promote smooth boiling of the mixture. The vessel was provided with a sidearm for distillation purposes. A receiver was connected to the sidearm to collect the distillate and provided with a vacuum pump connection. To carry out the first step of the ester-interchange the vessel was heated at 200° C. for two hours at 760 mm. pressure and was continuously flushed with nitrogen. The methanol which distilled over was collected in the receiver.

To proceed to the second stage of the ester-interchange the vessel was gradually heated to 275–280° C., and then slowly evacuated to 0.1–0.2 mm., which required about ½ hour. Heating was continued under these conditions, during which time the glycol distilled off, giving rise to polymeric material. At the end of the heating period the vacuum source was closed off, nitrogen was slowly admitted and the polymerization vessel allowed to cool. When sufficiently cooled the polymer was removed. The polymer had a softening point of about 220° C., a melting point of 258–264° C., and was an opaque brittle solid. Its composition was postulated to be

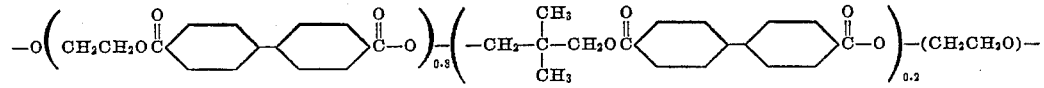

The polymer was extruded both as films and filaments. The quenched film was transparent, flexible, pliable, and tough. The filaments could be cold-drawn to yield fibers of high strength and good extensibility. In addition the polyester could be molded into rods, tubes, and other shaped articles.

A series of polyesters were prepared according to the process of Example I, the data being shown in Table I below. In preparing the polyesters, the starting molar ratio of 4,4'-dimethyl bibenzoate (DMBB) to total glycol was 1 to 2.2 in all cases. The percentages of glycols in the table refer to mole percent, based on the total glycol used. For example in Run No. 3 (DMBB plus 25% neopentylene glycol and 75% ethylene glycol) there was charged into the reaction vessel 1 mole of DMBB and 2.2 moles of a mixture made up of 25 mole percent neopentylene glycol and 75 mole percent ethylene glycol. In all runs the catalyst was a 50–50 weight percent mixture of litharge and cobaltous acetate, and its concentration was 0.2%, based on the weight of DMBB. In each run the heating was conducted at 760 mm. during the first portion, and at a high vacuum during the final period (i.e., 0.1–0.2 mm.).

Table I

| Run No. | Reactants | Approximate Melting Point, °C. | Drawability of Filaments | Brittleness of Films |
|---|---|---|---|---|
| 1 | DMBB plus 100% neopentylene glycol. | 135–140 | None | Brittle. |
| 2 | DMBB plus 75% neopentylene glycol and 25% ethylene glycol. | 133–137 | Good | Flexible. |
| 3 | DMBB plus 25% neopentylene glycol and 75% ethylene glycol. | 223–226 | ___do___ | Do. |
| 4 | DMBB plus 20% neopentylene glycol and 80% ethylene glycol. | 258–264 | ___do___ | Do. |
| 5 | DMBB plus 100% ethylene glycol. | 368–369 | None | Brittle. |
| 6 | DMBB plus 100% tetramethylene glycol. | 300–302 | ___do___ | Slightly Flexible. |
| 7 | DMBB plus 60% neopentylene glycol and 40% tetramethylene glycol. | 145–150 | Good | Flexible. |
| 8 | DMBB plus 100% decamethylene glycol. | 165–167 | None | Slightly Flexible. |
| 9 | DMBB plus 65% neopentylene glycol and 35% decamethylene glycol. | 116–121 | Good | Flexible. |

The inferiority of the homopolyesters (Runs 1 and 5) as compared to the copolyesters is evident.

In general, the shorter the chain length of the glycol with which neopentylene glycol is copolymerized, the greater is the drawability and flexibility of the film and hence the more effective is the disruption of crystallinity. This is logical, since longer glycols would impart greater flexibility to the polymer chains and thus allow the bibenzoate nuclei to approach each other and form crystallites more readily.

It is apparent from the data that copolyesters of bibenzoic acid with neopentylene glycol and either tetramethylene or decamethylene glycols, even though they may have the proper crystallinity characteristics, are too low melting to meet the preferred melting point range of 200–270° C. In the case of the neopentylene glycol-ethylene glycol copolyesters the melting point drops rapidly as the mole percentage of neopentylene glycol is increased, but in the range where desirable crystallinity characteristics are reached the melting points are still high enough for useful films. Thus, control can be exercised over both crystallinity and melting point. The preferred copolymer is one which softens at about 220° C., and melts at about 265° C. The wide range between these temperatures is desirable from the standpoint of after-processing operations.

In preparing a film on the basis of clarity and flexibility alone from a polyester of DMBB, ethylene glycol, and neopentylene glycol, the ethylene glycol should be present in the starting reaction mixture in an amount of from 25–80 mole percent of total glycol; in which case the neopentylene glycol will comprise 20–75 mole percent. In the case of tetramethylene glycol-neopentylene glycol polyesterified with DMBB it is preferable that the tetramethylene glycol be present in the starting reaction mixture in an amount from 15–50 mole percent of total glycol and 50–85 mole percent of neopentylene glycol. A decamethylene-neopentylene glycol-DMBB starting mixture should contain 65–95 mole percent of neopentylene glycol to 35–5 mole percent of the decamethylene glycol based on total glycol. If in addition to clarity and flexibility, one desires to bring in as a third element, the melting point of the film, the mole ratios of reactants will be narrowed accordingly, but within the broad ranges set out above. The melting point of course is set by the uses to which the customer intends for the product.

This application is a continuation-in-part of application Serial No. 604,629, filed August 17, 1956.

Various changes and modifications may be made in practicing the invention without departing from the spirit and scope thereof and, therefore, the invention is not to be limited except as defined in the appended claims.

We claim:

1. A filament- and film-forming linear interpolyester formed from reactants consisting essentially of p,p'-bibenzoic acid and from about 2.05 to about 2.25 mols of mixed glycols per mol of said acid, said mixed glycols consisting essentially of from 75 to 20 mol percent of a branched chain $C_2$–$C_{10}$ alkylene glycol and from 25 to 80 mol percent of a straight chain $C_2$–$C_{10}$ alkylene glycol, said interpolyester melting above 140° C.

2. The linear interpolyester of claim 1 melting above 200° C.

3. The linear interpolyester of claim 1 wherein the mixed glycols consist essentially of from about 20 to 25 mol percent of neopentylene glycol and from about 80 to 75 mol percent of ethylene glycol.

4. The process of preparing filament- and film-forming linear interpolyesters which comprises reacting components consisting essentially of a lower alkyl diester of p,p'-bibenzoic acid and from about 2.05 to about 2.25 mols of mixed glycols per mol of said diester, said mixed glycols consisting essentially of from 75 to 20 mol percent of a branched chain $C_2$–$C_{10}$ alkylene glycol and from 25 to 80 mol percent of a straight chain $C_2$–$C_{10}$ alkylene glycol at a temperature above 150° C. in the presence of an ester interchange catalyst and in the absence of oxygen and moisture, said linear interpolyester melting above 140° C.

5. The process of claim 4 wherein the catalyst is cobalt acetate.

6. The process of claim 4 wherein the initial reaction temperature is kept from 150 to 200° C. until no further alcohol is liberated and thereafter the temperature is raised to from 200 to 400° C. with a gradual reduction of reaction pressure to less than 15 mm. of mercury.

7. The process of claim 6 wherein the initial temperature ranges from 175 to 200° C.; the temperature is raised to from 250 to 350° C. and the pressure is reduced to from 0.1 to 0.2 mm. of mercury.

8. The process of claim 7 wherein the mixed glycol reactants consist essentially of from 20 to 25 mol percent of neopentylene glycol and from 80 to 75 mol percent of ethylene glycol.

References Cited in the file of this patent

UNITED STATES PATENTS

| 2,578,660 | Auspos et al. | Dec. 18, 1951 |
| 2,595,343 | Drewitt | May 6, 1952 |
| 2,623,033 | Snyder | Dec. 23, 1952 |
| 2,720,503 | Wellman | Oct. 11, 1955 |
| 2,727,881 | Caldwell et al. | Dec. 20, 1955 |
| 2,839,492 | Caldwell et al. | June 17, 1958 |

FOREIGN PATENTS

| 588,833 | Great Britain | June 4, 1947 |